United States Patent
Matian

(10) Patent No.: US 12,148,965 B2
(45) Date of Patent: Nov. 19, 2024

(54) FUEL CELLS

(71) Applicant: EH GROUP ENGINEERING AG, Prangins (CH)

(72) Inventor: Mardit Matian, Prangins (CH)

(73) Assignee: EH Group Engineering SA, Nyon (CH)

( * ) Notice: Subject to any disclaimer, the term of this patent is extended or adjusted under 35 U.S.C. 154(b) by 991 days.

(21) Appl. No.: 17/257,063

(22) PCT Filed: Jul. 3, 2019

(86) PCT No.: PCT/IB2019/055677
§ 371 (c)(1),
(2) Date: Dec. 30, 2020

(87) PCT Pub. No.: WO2020/008387
PCT Pub. Date: Jan. 9, 2020

(65) Prior Publication Data
US 2021/0126276 A1  Apr. 29, 2021

(30) Foreign Application Priority Data

Jul. 5, 2018  (CH) ...................... 00838/18

(51) Int. Cl.
| | |
|---|---|
| H01M 8/2483 | (2016.01) |
| H01M 8/0258 | (2016.01) |
| H01M 8/0267 | (2016.01) |
| H01M 8/04029 | (2016.01) |
| H01M 8/1004 | (2016.01) |

(52) U.S. Cl.
CPC ....... H01M 8/2483 (2016.02); H01M 8/0258 (2013.01); H01M 8/0267 (2013.01); H01M 8/04029 (2013.01); H01M 8/1004 (2013.01)

(58) Field of Classification Search
CPC ............. H01M 8/2483; H01M 8/0258; H01M 8/0267; H01M 8/04029; H01M 8/1004; Y02E 60/50; Y02P 70/50
See application file for complete search history.

(56) References Cited

U.S. PATENT DOCUMENTS

| | | | |
|---|---|---|---|
| 4,590,135 A | 5/1986 | Warszawski et al. | |
| 5,514,487 A | 5/1996 | Washington et al. | |
| 6,017,648 A | 1/2000 | Jones | |
| 6,037,072 A * | 3/2000 | Wilson ................. | H01M 8/242 |
| | | | 429/492 |
| 6,174,616 B1 | 1/2001 | Marvin et al. | |
| 2003/0215692 A1 | 11/2003 | Rock et al. | |
| 2004/0058249 A1 * | 3/2004 | Cai ..................... | H01M 8/0221 |
| | | | 429/129 |
| 2004/0115512 A1 | 6/2004 | Fujii et al. | |
| 2008/0131755 A1 | 6/2008 | Lee et al. | |
| 2009/0162733 A1 | 6/2009 | Iverson et al. | |
| 2010/0297516 A1 | 11/2010 | Das et al. | |
| 2011/0033782 A1 | 2/2011 | Chin et al. | |
| 2015/0118595 A1 * | 4/2015 | Hasegawa ........... | H01M 4/8626 |
| | | | 429/481 |
| 2016/0197373 A1 * | 7/2016 | Shaffer, II .......... | H01M 50/463 |
| | | | 429/210 |
| 2018/0026291 A1 | 1/2018 | Okada et al. | |

FOREIGN PATENT DOCUMENTS

| | | |
|---|---|---|
| EP | 1630892 A2 | 3/2006 |
| JP | H0935726 A | 2/1997 |
| JP | 2012248472 A | 12/2012 |
| JP | 2015133269 A | 7/2015 |
| JP | 2018018582 A | 2/2018 |
| WO | 2017077634 A1 | 5/2017 |

OTHER PUBLICATIONS

International Search Report for PCT/IB2019/055677 dated Nov. 6, 2019.
Written Opinion for PCT/IB2019/055677 dated Nov. 6, 2019.

* cited by examiner

*Primary Examiner* — Muhammad S Siddiquee
(74) *Attorney, Agent, or Firm* — Pearne & Gordon LLP

(57) ABSTRACT

A fuel cell assembly includes an CCM layer with a sub-gasket frame around it to provide gas manifolds and sealant. A flow path is integrated on the sub-gasket in vicinity of the inlet and outlet manifolds that provides a passage for the gases to/from the active area. The flow path provides a rigid path without deforming or clogging the passage.

13 Claims, 8 Drawing Sheets

FUEL CELLS

CORRESPONDING APPLICATIONS

The present application claims priority to earlier Swiss application No 00838/18, filed on Jul. 5, 2018 in the name of EH GROUP Engineering AG, the content of this earlier application being incorporated by reference in its entirety in the present application.

BACKGROUND OF THE INVENTION

The present invention relates to a fuel cell module and a method for manufacturing the same.

PRIOR ART AND SUMMARY OF THE INVENTION

Both patent application No. JP2015-133269A and US2018026291A1 developed a new concept for gas inlet/outlet manifolds with the use of a resin frame around the membrane-electrode-assembly (MEA) in order to connect the main gas manifolds to the cell active area. The MEA is then sandwich between two plates or separators with appropriate sealing materials. As also stated in the patent application JP2018018582A the drawback of this structure is that there is a high probability of deforming the gas flow passage after compression and fatigue, and therefore clogging the gas passage.

As a result, the patent application JP2018018582A proposed a different design that slightly improves the situation. They also used some resin type materials in order to create a connection between the gas main manifolds and the cell active area, which improves the design. However, a few limitations of this approach are: a) due to the cross-passing of two resins on both sides of the membrane and on top of each other the clogging of the gas flow passage is inevitable and after long hours of operation, several thermal cycles and fatigue, there is a high chance of deformation and blockage of the passage as it is also stated by the authors; b) the clogging of the passage would increase pressure drop within the assembly; c) the MEA and gas diffusion layer (MEGA) is assembled at several steps with various materials. Those are bonded together at temperatures higher than 140° C. at different steps and positions. It introduces some additional complexity in the view of membrane deformation, reliability, manufacturability and limits production speed.

There are other patent applications with various proposed designs such as U.S. Pat. No. 6,174,616B1, EP1630892A2 or JP2012248472A—in all cases there is either stamping/embossing or machining of the plates which generates a large pressure drop within the assembly and brings in complexity in production. In patent applications JPH0935726A or U.S. Pat. No. 6,017,648A a separate piece is introduced in the sub-assembly; in order to integrate the piece, some machining or embossing on the plates are required. due to nature of the design deformation of the passage is expected on long hours of operation and also for mass production it introduces limitation. In patent application U.S. Pat. No. 5,514,487A, the design is more complex due to split of the plate into three pieces, which could be bring in similar clogging and leakage issues. In patent application US2008131755A1 the design is mainly used in cells with graphite plates which are thicker than metallic plates—large pressure drops are inevitable.

As a result, an aim of the present invention is to propose a new solution which minimises pressure drop across the passage and can eliminates clogging of the flow-path. The proposed design is simpler, more reliable and easier to produce than known products, especially for larger volumes. It can be integrated on the MEA or directly on the cell without any machining or embossing of the plates.

In an embodiment, the invention proposes a fuel cell assembly comprising an CCM layer with a sub-gasket frame around it to provide gas manifolds and sealant. A flow-path "FP" that is integrated on the sub-gasket in vicinity of the inlet and outlet manifolds that provides a passage for the gases to/from the active area. The FP provide a rigid path without deforming or clogging the passage.

In embodiments, the invention concerns a flow path for a fuel cell, wherein the cell may comprise at least a bottom plate, a top plate, an active area formed by a membrane electrode assembly between said plates and a gasket on each side of said membrane electrode assembly, wherein said fuel cell further comprises manifolds for the passage of gas in said cell, the flow path being placed between said manifold and said active area, wherein the flow path comprises means to ensure a passage of gas with minimum pressure loss.

In embodiments, the means for ensuring a passage of gas may comprise at least a first set of a plurality of wires.

In embodiments, the wires may be straight or curved, forming straight channels or tilted channels or curved channels.

In embodiments, the flow path may comprise a flat piece on which the wires are attached.

In embodiments, the flow path may comprise a second set of wires with which and/or to which the first set of wires may be attached.

In embodiments, the second set of wires may be perpendicular to the first set of wires. Alternatively, another relative angle may be used. Also, in some embodiments, the angle may vary between wires.

In embodiments, the second set of wires may be interwoven with the first set of wires. Another equivalent arranged is also possible in the frame of the present invention.

In embodiments, said first and second set of wires may be of the same material or of a different material. In some embodiments, the material of the wires of one set (the first or the second) may be the same materials or different materials.

In embodiments, said wires may be made of metal and/or synthetic materials.

In embodiments, the invention concerns a frame comprising a flow path as defined herein.

In embodiments, the invention concerns a fuel cell comprising at least a bottom plate, a top plate, an active area formed by a membrane electrode assembly between said plates and a gasket on each side of said membrane electrode assembly, wherein said fuel cell further comprises manifolds for the passage of gas in said cell, wherein said fuel cell comprises a flow path as defined in in the present application or a frame as defined in in the present application between said membrane electrode assembly and said manifolds.

In embodiments, the manifolds may form the inlet and the outlet of the cell, and the flow paths may be the same at the inlet and at the outlet of the cell.

In embodiments, the manifolds may form the inlet and the outlet of the cell, and the flow paths may not be the same at the inlet and at the outlet of the cell.

In embodiments, the invention concerns an assembly comprising at least fuel cell as defined in the present application and a cooling plate.

In embodiments, the assembly may comprise a plurality of stacked fuel cells and cooling plates, the cooling plates being interposed between the fuel cells. A cooling plate may be present between each fuel cell or not.

In embodiments of the assembly, the frame may act as a spacer between cells and a support for the flow paths.

In embodiments, the invention concerns a method for producing a flow path as defined in the present application or for producing a frame as in the present application and the product obtained by the method. The method preferably comprises a step of compression or injection moulding of the flow path or the frame. Of course, other equivalent methods and steps may be envisaged in the frame of the present invention.

BRIEF DESCRIPTION OF THE DRAWINGS

FIG. 1 illustrates an embodiment of a single cell assembly according to the present invention;

FIG. 2 illustrates embodiments and structures of a flow path ("FP") according to the present invention;

FIG. 3 illustrates a top view and a side view of a flow path according to an embodiment of the present invention with its dimensions;

FIG. 4 illustrates a top view and a side view of a flow path according to an embodiment of the present invention with its dimensions;

FIG. 5 illustrates a top view and a side view of a flow path according to an embodiment of the present invention with its dimensions;

FIG. 6 illustrates a top view of a flow path according to an embodiment of the present invention with mixed wires;

FIG. 7 illustrates the integration of a flow path into a cell assembly according to embodiments of the present invention;

FIG. 8 illustrates another embodiment of the present invention with flowpath structures;

FIG. 9 illustrates top and side views of another embodiment of the present invention with the bonding of a flow path to MEA and sub-gasket;

FIG. 10 illustrates a cross-sectional view of a single cell according to an embodiment of the present invention;

FIG. 11 illustrates embodiments of flow paths at the inlet and outlet of a cell according to embodiments of the present invention;

FIGS. 12 and 13 illustrates alternative designs as embodiments of flow paths with tilted or curved channels;

FIG. 14 illustrates an embodiment of a cooling plate with a flow path according to the present invention.

DETAILED DESCRIPTION OF THE EMBODIMENTS

Single Cell Assembly

Figure 1:
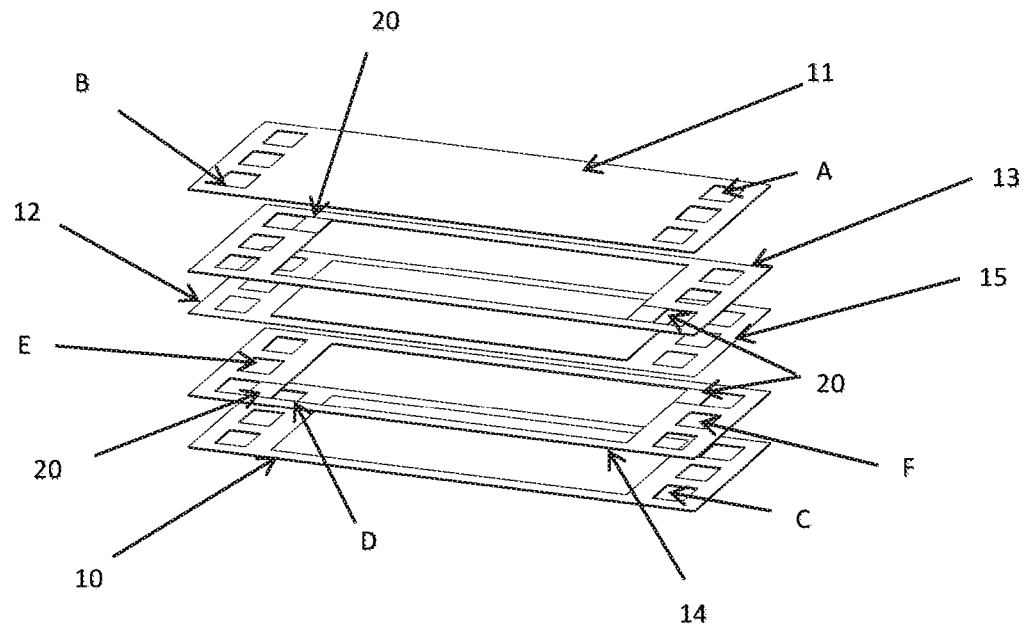
FIGS. 1 to 14 illustrates embodiments of the present invention, specifically

FIG. 1. shows an exploded view of a single cell assembly according to an embodiment with plates 10, 11 at two ends (bottom plate 10 and top plate 11), a membrane-electrode-assembly 12 (MEA) in the middle with a gas-diffusion-layer 12' (GDL) on both sides of the MEA 12, and gaskets 13, 14 that goes on both sides of the MEA 12 between the plates and the extended part of the MEA 12 with gas manifolds.

For example, on the cathode (top) side of the MEA gas enters the cell from the manifold A and exits the cell from the manifold B. In a similar manner on the anode (bottom) side of the MEA 12, gas enters the cell from manifold C and exits the cell from manifold D. Two other manifolds E and F are for a cooling loop where the flow-path are not shown here.

The extensions around the active area is often call 'sub-gasket' 15 and this is where the gas manifold cuts are integrated; the sub-gasket material is made of plastic, resin or rubber type material that are available in the market.

Figure 2:
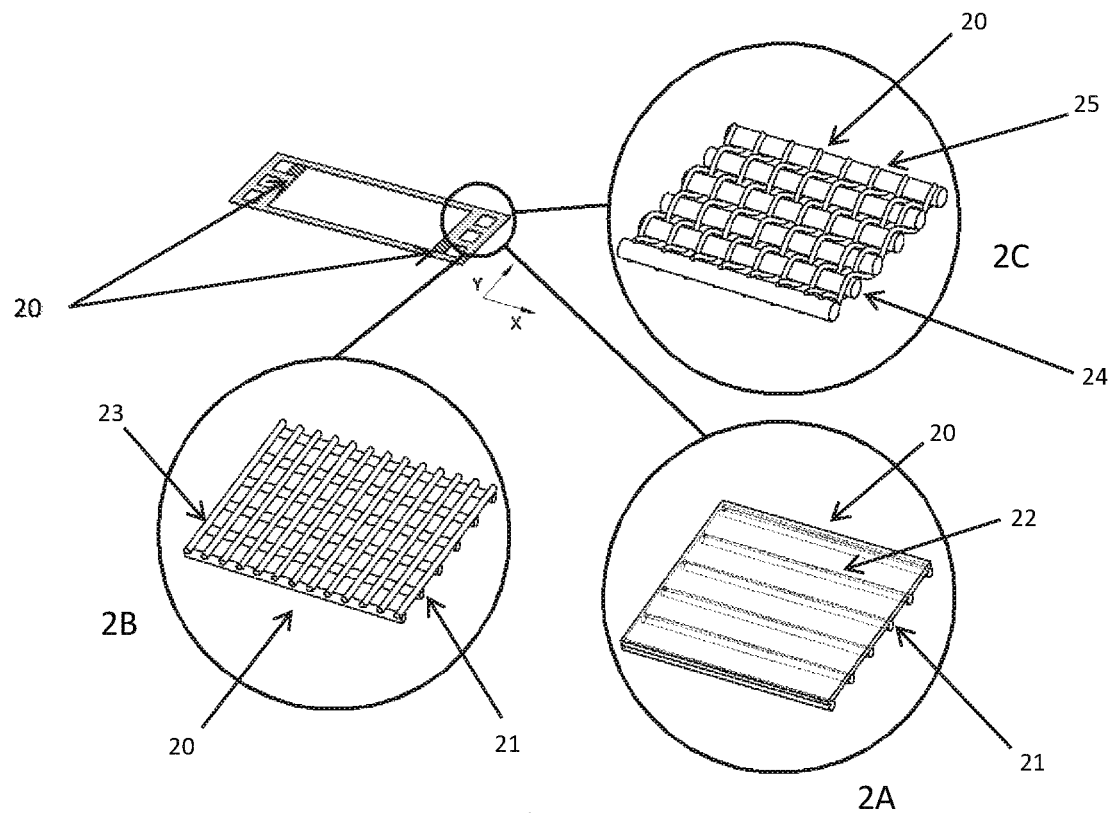

According to an embodiment of the present invention, there is a piece so called flow-path "FP" 20 integrated in the extremity of the active area and sub-gasket 15 that helps passage of the gases to and from the active area as shown in FIGS. 1 and 2. The flow path 20 is produced in such a way that gases can pass through it with minimum pressure loss and also the chances of deformation are completely eliminated due to its strong mechanical structure.

Unlike the patent JP2018018582A, one advantage of this invention is that the flow path is completely flat, which helps significantly to minimise deformation of the piece, sub-gasket 15 and the plates 10, 11 after compression and also homogenise applied pressure everywhere around the manifolds A, B, C and D. The latter assists to minimise leakages from the cells.

After pilling up all the layers on top of each other (as illustrated in FIG. 1), one side of the flow path 20 is in direct contact with the plate 10, 11 and the other side of the flow path 20 is in a direct contact with the extensions 15 of the MEA and there is no uneven or 'cross-passing' anywhere on the piece, which is the case in JP2018018582A. As a result, it guarantees that there is no uneven pressure applied on the flow path 20 and therefore homogeneous gas distribution within the GDL and gas channels are guaranteed and also the chances of blocking or clogging the passage is eliminated.

Another advantage is that the number of pieces 20 in the assembly is reduced unlike JP2018018582A where there are two different types of resins, sub-gaskets and the rest. In embodiments of the invention the flow path 20 is directly attached to the sub-gasket without any additional piece or effort required.

Another advantage is that the gap between ribs in the flow path 20 can be increased to adapt the cell geometry and reduce pressure drop without deforming the piece, thanks to the rigid structure of the piece. Another advantage of the current invention is that various gasket concepts can be integrated with the flow path 20; for example, flat gasket can be mounted side by side the FP flow path 20 or dispensed gasket can be used around the piece. Furthermore, from automation point of view the current invention brings in speed and simplicity into the design and also minimise the quality control steps during final assembly.

Embodiments of Flow-Path "FP" 20 Structures

The flow path 20 can be produced in various shapes using different techniques. Examples are shown here; however, the invention is not limited to structure explained below or illustrated in the drawings.

Figure 3:
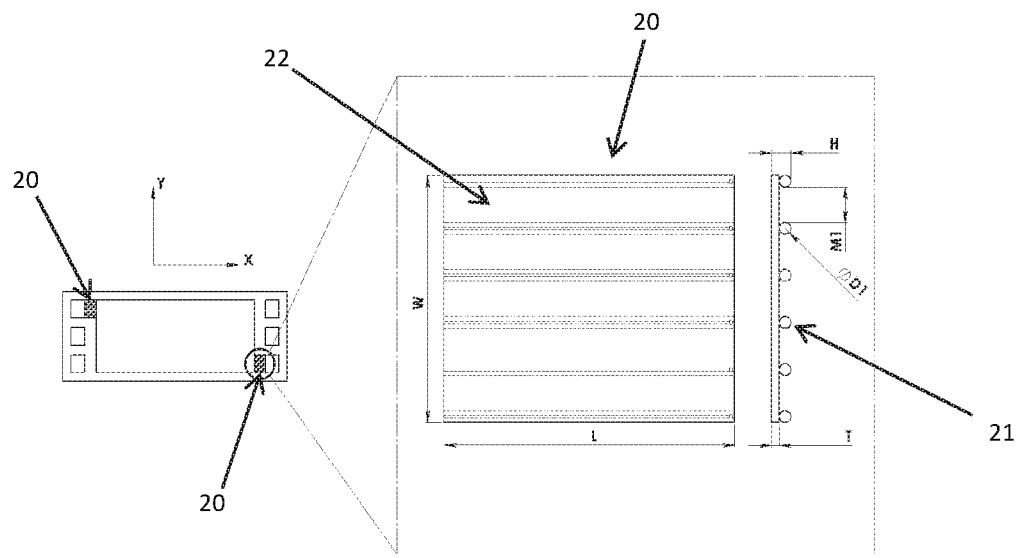

Structure 2A (FIGS. 2 and 3)

FIG. 2. shows a detailed view of the gasket assembly and the proposed examples of structures for the flow path piece 20. The structure is made of parallel wires 21 in directions of X and a flat piece 22 on top. The plurality of wires 21 is in the X direction, parallel to direction of gas flow.

The wires 21 in structures 2A that acts as flow guidance in the unit 20, may be disposed at substantially identical distance from each other indicated by M1 (in FIG. 3) or the distance between the wires 21 can be different based on the geometry and design requirements. However, to have a strong mechanical support and to avoid any mechanical deformation and clogging of the channels underneath it is preferred to have them positioned at identical distance from each other. Of course, the distance between wires may also be variable. The distance between the wires 21 (M1) is preferably 10-700 µm, more preferably 50-300 µm, and especially preferably 100-250 µm; however, the distance M1 is not limited to the values mentioned above which are exemplary and/or preferred values. The flat piece 22 on top of the wires 21 in structure 2A is preferably made of the same material as the wires and its thickness can be adjusted based on the stack assembly configuration. If the distance between the wires 21 is larger than what is required, the compression force of the assembly may deform the flat piece 22; therefore, the design and distance between the wires 21 should be defined carefully. The total height H of the structure 2A is the sum of the wire 21 diameter and thickness of the top plate 22; i.e. H=D1+T see FIG. 3.

If in a specific design the length of the flow path 20 (L) is very long then it creates a larger pressure drop; therefore, by increasing diameter of the wires 21 (D1) and also distance between the wires 21 (M1) it is possible to reduce the pressure drop.

Furthermore, it is very well possible to have two different flow path structures 20 at the inlet and outlet of the cell; for instance, based on the total amount of water produced on the cathode side it is possible to have a flow path structure 20 where distance between the wires 21 at the outlet is larger than the distance of the same at the inlet side. From the manufacturability point of view, it is perhaps recommended to have the same thickness at both ends of the cell but embodiments of the invention are not limited to this condition.

There is no particular limitation on material used in the flow path 20 of structure 2A. since the structure is positioned outside of the active area of the cell it is not necessary to produce it from a conductive material. Some examples include stainless steel, titanium or rigid plastics such as PET, PEEK, epoxy resins, urethane resin, polyamide resins, acrylic resins, carbon fibres or anything else. If the structure is made of steel type materials and corrosion of the piece is of a concern, anti-corrosion treatment may be applied on the surface. Since electrical conductivity of piece is not a concern, several low conducive coating treatments can be considered; some examples are: PTFE, PVDF or Diamond Like Coating (DLC) coating. If for any reason the flow path structure 20 is located under the active area of the cell and electrical conductivity may be required, other coating treatments such as CVD or PVD coating can be considered as non-limiting examples.

There are several methods for producing such a flow path structure 20; for instance, in case of stainless steel the small wires 21 can be welded on the flat piece 22 or in case of plastic materials they can be bonded together with special adhesives or hot-melt machinery, they can also be produced by compression or injection moulding at the same time or by laser welding and cutting, etching or any other suitable method.

Figure 4:
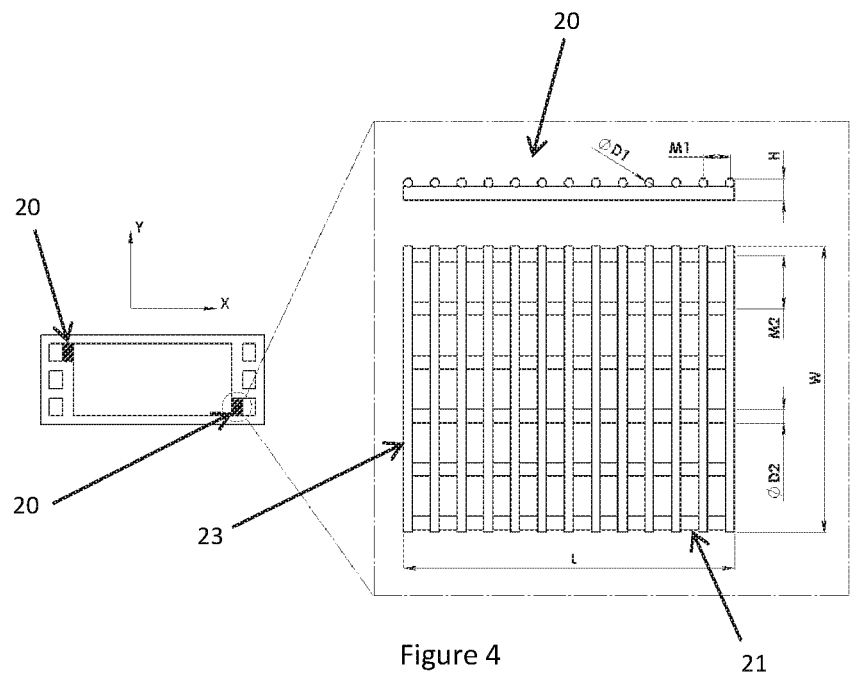

Structure 2B (FIGS. 2 and 4)

The structure 2B is made of parallel wires 21, 23 in directions of X and Y that are oriented perpendicularly on top of each other. The plurality of wires 21 is in the X direction, parallel to the direction of gas flow, and the plurality of wires 23 positioned on top acts as mechanical and structural support for the wires 21 at the bottom.

The distance between the wires 23 (M1), see FIG. 4, may be substantially identical or can be different based on the geometry and design requirements. However, to have a strong mechanical support on top and to avoid any mechanical deformation and clogging of the channels underneath it is recommended to have them positioned very close to each other at identical distance from each other. Of course, the distance between wires may also be variable. The distance between the wires 23 (M1) is preferably 10-500 µm, more preferably 25-250 µm, and especially preferably 100-200 µm; the distance M1 is not limited to the values mentioned above which are exemplary and/or preferred values.

The distance between the wires 21 (M2) may be substantially identical or can be different based on the geometry and design requirements. In order to have a uniform flow distribution at the outlet of the FP, it is recommended to have uniform distance between the wires; however, it is very well possible to have a non-uniform distance between the wires in order to regulate the flow distribution. For example, the wires that are closer to the edge of the cell may be closer to each other and the wires that are more towards the middle of the cells may have larger distance between them, this would help to deviate the flow towards the middle of the cell. The distance between the wires 21 (M2) is preferably 25-1000 µm, more preferably 50-500 µm, and especially preferably 100-200 µm; the distance M2 is not limited to the values mentioned above which are exemplary and/or preferred values. It is recommended that M1, the pitch between the wires 23 on top, be less than M2, the pitch of the wires 21 underneath. This is mainly to guarantee a proper mechanical support of the unit, and to achieve that, the preferred ratio of (M1/M2) is between 0.2-0.8 and more preferably 0.3-0.6 but not limited to these values which are exemplary and/or preferred values.

Structure 2B can be produced in similar methods as the structure 2A and embodiments are not limited to those methods.

Figure 5:
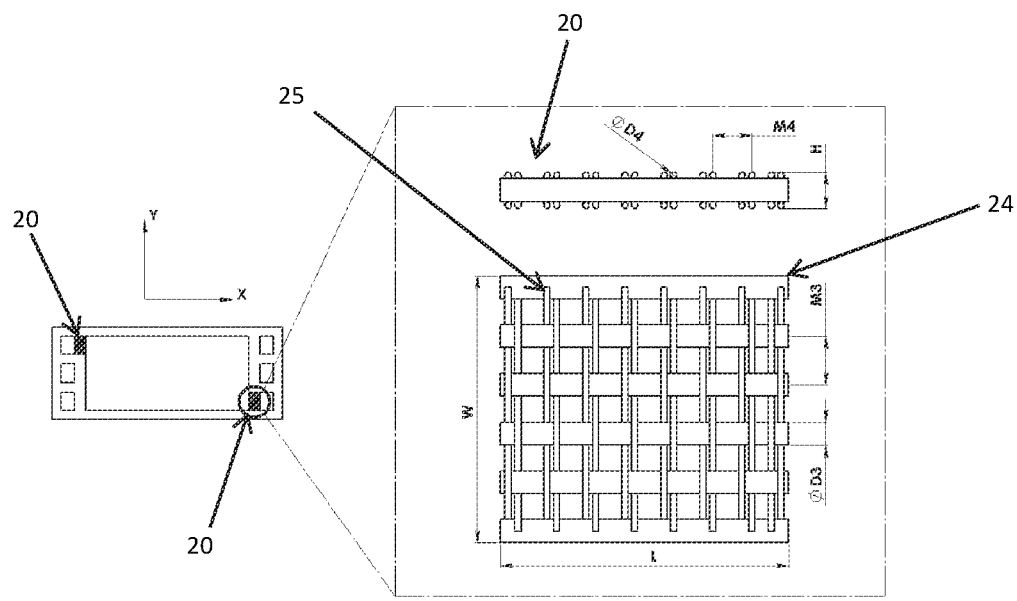
Figure 6:
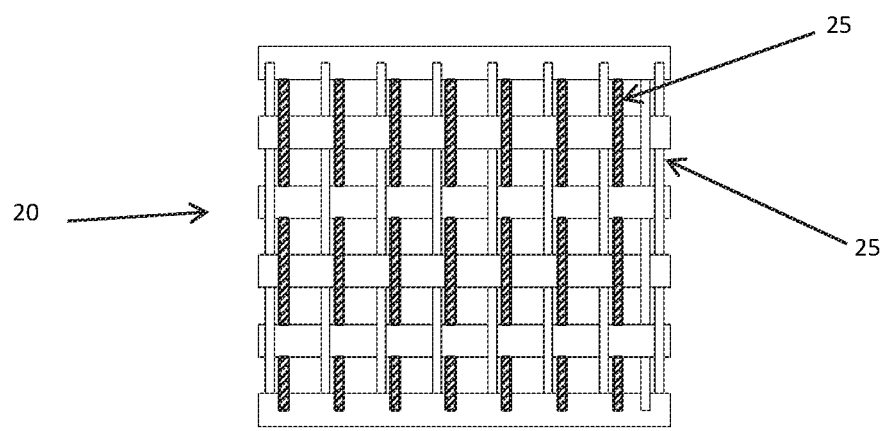

Structure 2C (FIGS. 2, 5 and 6)

The structure 2C is made of parallel wires 24 in direction of X and thinner interwoven wires 25 in direction of Y with perpendicular orientation against wires 24. The plurality of wires 24 is in the X direction, parallel to the direction of gas flow, and the plurality of wires 25 interwoven on wires 24 acts as mechanical and structural support for the wires 24.

The wires 25 in structure 2C that act as mechanical support for the unit 20, may be disposed at substantially identical distance from each other indicated by M4 (in FIG. 5) or the distance between the wires 25 can be different based on the geometry and cell design. Having a smaller pitch on the wires 25 would increase pressure drop across the structure, on the other hand, larger pitch would bring in some instability into the structure. Therefore, it is preferred and easily possible to adjust the distance between the wires 25 in order to minimise the pressure drop and at the same time have a strong mechanical structure. The distance between the pairs of wires 25 (M4) is preferably 10-1000 µm, more preferably 50-800 µm, and especially preferably 200-500 µm; however, it is not limited to the values mentioned above which are exemplary and/or preferred values.

In a similar manner, the larger wires 24 are positioned in parallel to direction of the flow, direction of X in FIG. 5, and the distances between the wires 24 (M3) are preferably identical. Of course, the distance between wires may also be variable. The distance between the wires 24 (M3) is preferably 25-1000 µm, more preferably 50-500 µm, and especially preferably 100-200 µm; however, the distance M3 is not limited to the values mentioned above which are exemplary and/or preferred values. The cross-sectional shapes of the wires 24 and 25 are not limited and they can have different shapes such as round, rectangular, oval or anything else—the preferred cross-section being round or rectangular.

In FIG. 5 wires 24 and 25 have round cross-sections and diameter of the wire 24 is (D3) and diameter of the wires 25 is (D4). The total height of the structure 2C is sum of the two diameters; i.e. (D3+D4). It is preferred to have smaller diameter on wire 25 (D4) than wires 24 (D3), one of the main reasons is that the gas flows in parallel to wires 24 and in order to minimise the pressure drop of the passage, it is recommended to have wires with thinner diameters.

Another advantage of this structure is that the wires 24 and wires 25 can be made of different materials. For instance, in embodiments, the wires 24 can be made of stainless steel and wires 25 can be made of thin plastic type materials such as PET, PE, PEEK, nylon, carbon or anything else. An example is shown in FIG. 6 where half of the wires 25, indicated by darker colour, are made of plastic materials and the rest from metallic materials. This structure 20 can be mounted on top of the sub-gasket 15 and with a simple hot-press it can be bonded to the sub-gasket around the MEA.

Integration Possibilities and Various Embodiments

Figure 7:
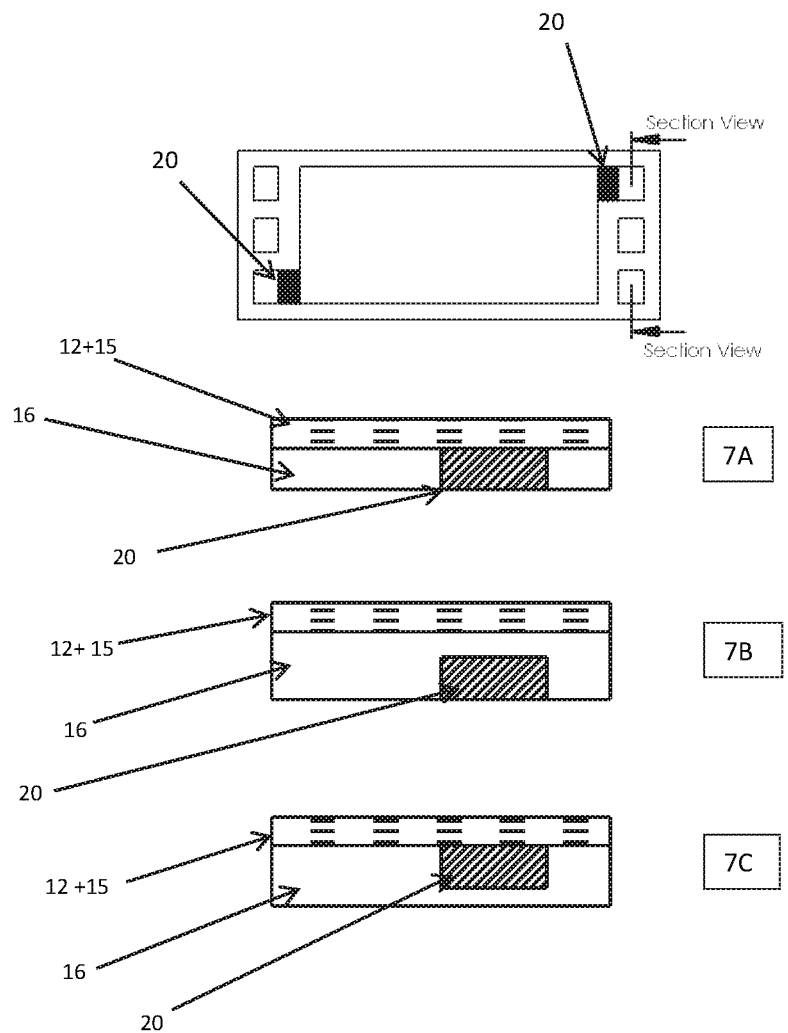

There are several design options and possibilities to integrate such flow path structures 20 in a stack assembly. A few examples are shown in FIG. 7.

In one embodiment, FIG. 7A, the flow path 20 and the gasket 13 have the same thickness and are mounted side by side on the plate. The sealant 16 either a flat gasket 13 or dispensed or anything else is adjusted according to the height of the flow path 20, after assembly the sub-gasket 15 from the MEA sits on both sealant 16 and the flow path 20.

In another embodiment, FIG. 7B, the sealant 16 is thicker than the flow path 20 and encapsulates the flow path 20 from the sides and top, the MEA is mounted directly on top of the sealant 16.

In another embodiment, FIG. 7C, the flow path 20 is integrated directly in the plate (either top or bottom plates). There is an embossing or engraving on the plate where the flow path is located. This could be the case for cell made of graphite plates.

Other variations and embodiments are also possible within the frame and scope of the present invention.

Figure 9:
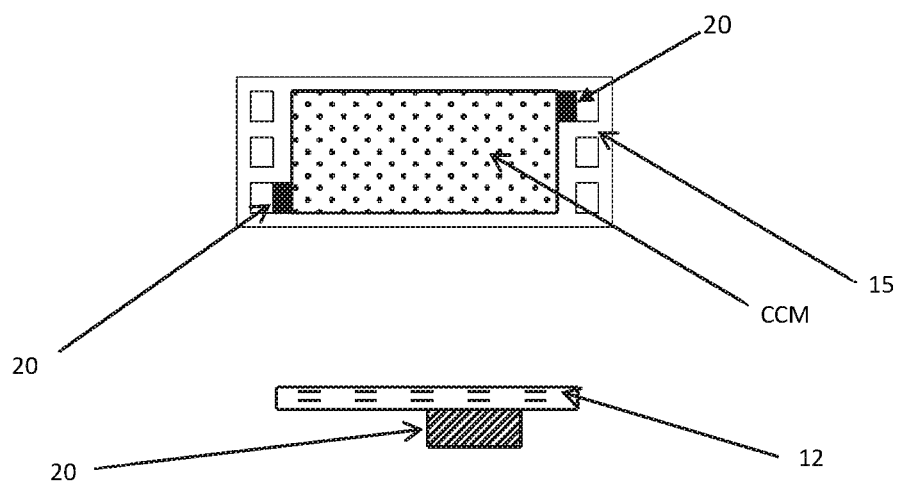

In case of embodiment of FIG. 7A, the flow path 20 is bonded to the sub-gasket 15 so that it is manipulated as one piece. There are several methods to bond the flow path 20 to the sub-gasket 15. For instance, hot-press or various adhesives can be used for the purpose but not limited. This is illustrated in FIG. 9.

Figure 8:
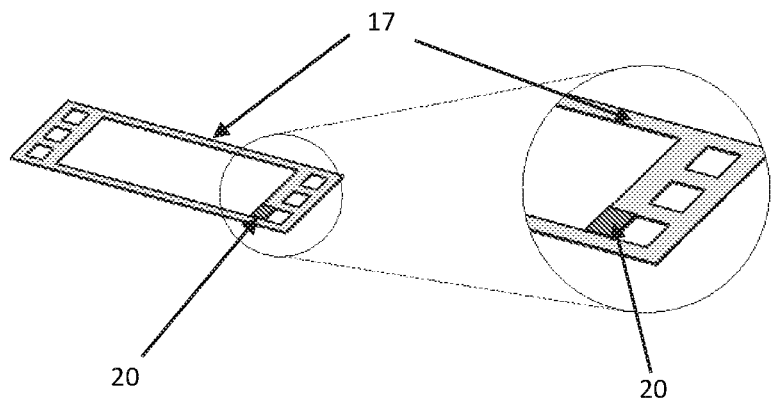

In another embodiment, the flow path 20 may be made with a frame 17 around it as shown in the FIG. 8. The frame 17 will act as a spacer and sealing material will sit on top and bottom of the frame. By varying the thickness of the frame 17, thickness of the sealing material can be optimised on the top and bottom as well. Similarly, to previous cases, the flow path 20 and the frame 17 around it can be made of different materials such as metal, PTFE, PE, PEN, PET, Epoxy but not limited to these materials. There are different methods to produce such a small assembly; for example, injection moulding, stamping or compression but not limited to those.

In another embodiment, the pieces forming the flow path 20 can be detached from each other and assembled in the cell separately—or the flow path 20 can be attached or fused to the gasket 15 around the cell and then the MEA put on top for compression. The following figure (i.e. FIG. 10), illustrates a cross-sectional view of a single cell with various components in the assembly identified. The top channel (plate 11) represents the anode side and the bottom channel (plate 10) the cathode side of the cell, a counter-flow configuration is considered in this case but it can be co-flow or even cross-flow. There are two sub-gaskets 15 bonded on top of each-other and two flow paths 20 are located at the inlet and outlet manifolds and rest of the cell is identical as to a conventional assembly. It is important to mention that the current invention is not limited to only this layout and various configurations can be considered.

As mentioned earlier, one of the main advantages of this invention compared to JP2018018582A is that there is no cross-passing of the flow path 20; therefore, deformation of the pieces is eliminated and all the components are compressed at flat state after assembly. This is illustrated in the FIG. 10.

Figure 11:
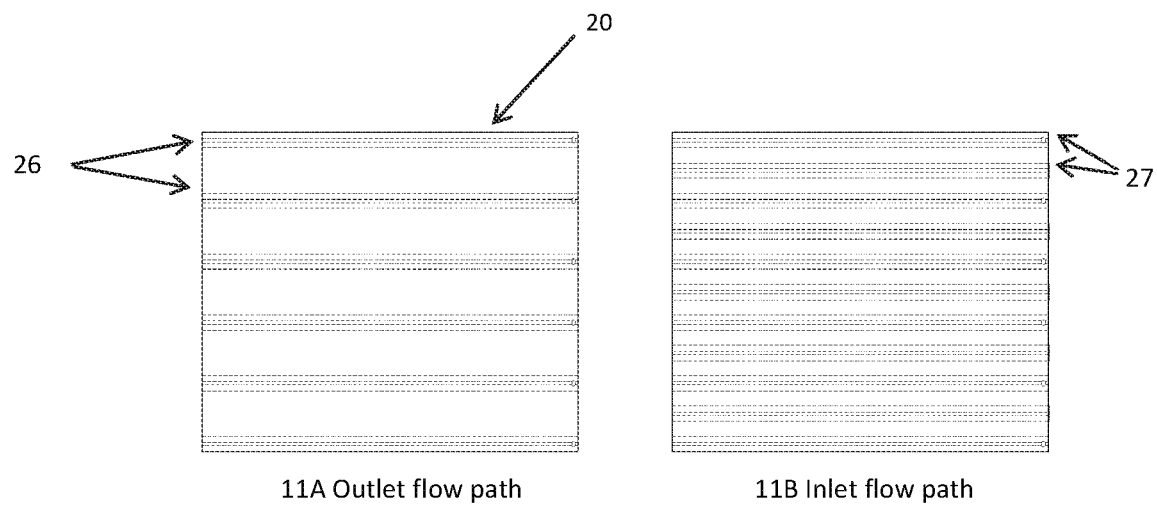

Another embodiment that helps water management inside a cell is to have two different flow paths 20 integrated at the inlet and outlet of the cell. For example, the flow path 20 at the outlet (FIG. 11A) can have a different design with larger space (gap 26) between the ribs as shown in FIG. 11 and the inlet flow path 20 (FIG. 11B) and smaller gap 27. Larger gap 26 between the channels would assist removal of the water from the cell and minimise the chances of wetting the cell, especially at the outlet regions.

Figure 12:
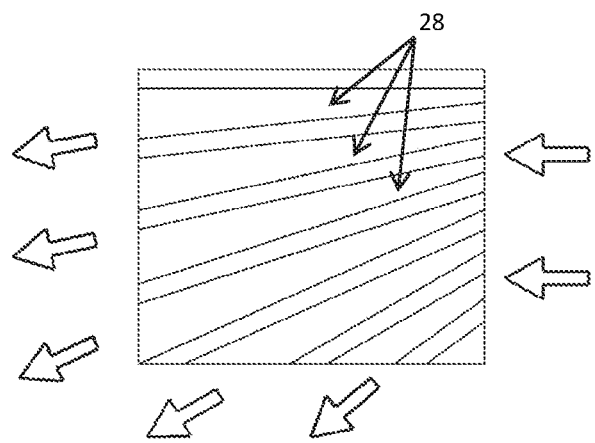
Figure 13:
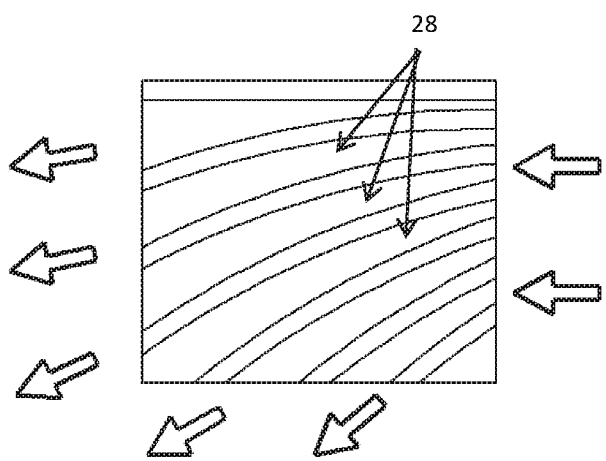

In another embodiment, the orientation of the ribs 28 formed for example by wires 21,24 on the flow path 20 can be tilted as shown in FIGS. 12 and 13. The gas enters from the right and exits from the left and bottom side of the flow path 20. This arrangement would assist to deviate and distribute gases within the cell more uniformly, and it can be used either at the inlet of outlet of the cells. Conventional approach to uniformly distribute gas within the cell is to have additional flow ribs/channels between the gas manifolds and active area as explained in patents like US2011/0033782 A1, US2009/0162733A1, US2010297516A1, U.S. Pat. No. 4,590,135A, JP2015133269A, US2009/0162733A1, US2004/0115512A1, WO2017077634A1, U.S. Pat. No. 6,174,616B1, US2003215692A1. Integration of an FP similar to what is proposed in this patent would certainly simplify the design and at the same time would reduce pressure drop in the cell significantly. The design is not limited to this particular figure and the ribs/channels 28 can have various shapes such as curves with different radiuses as shown in FIG. 13 defined by the shape of the wires of the flow path 20.

Figure 10:
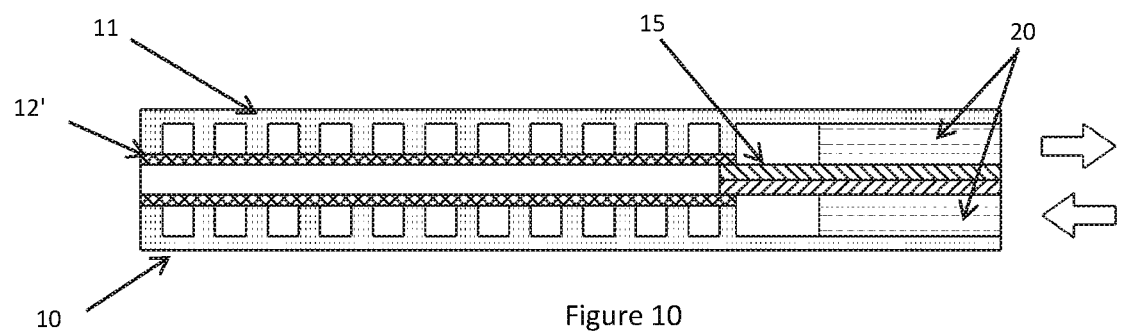
Figure 14:
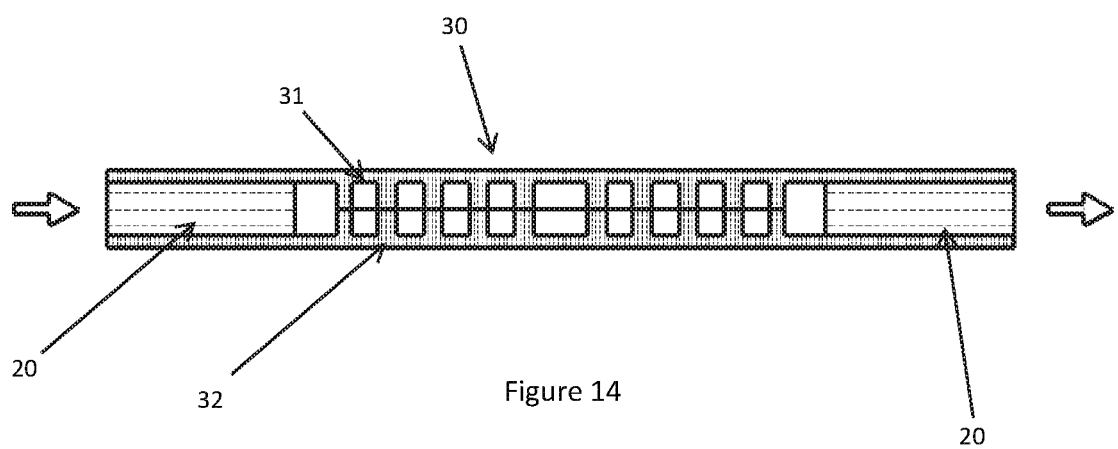

The flow path 20 can be used not only for the gas manifolds but also for a cooling loop as well. The concept and structure would be identical except in the cooling loop the flow path 20 will be surrounded by the gaskets and will be in contact with two plates 30 on top and bottom. In a fuel cell stack assembly, normally after each cell (for example as illustrated in FIG. 1 or 10) there is a cooling plate 30 integrated in order to dissipate the extra heat from the cells. From the structural point of view the flow channels can be identical to the gas channel with the difference that there is no MEA on the cooling side of the assembly. FIG. 14 is an example of a cooling plate 30 with liquid flows from left to the right with the water channels in the middle—there are two flow paths 20 integrated at the inlet and outlet sides and both of them are compressed and are in direct contact with the top and bottom plates 31, 32. Similar to the previous configurations the distance between the channels can be adjusted to minimise pressure drop within the cell. This is a cross-sectional view and the sealing materials are not visible.

The use of such a flow path 20 is not limited to only PEM fuel cell—it can be easily used in other type of devices such as Hi Temperature PEM (HT-PEM), Direct Methanol Fuel Cell (DMFC) or electrolysers with some minor modifications. Furthermore, there is no limitation on the material that the plates are made of they can be either metallic or graphite or any other composite material.

This description is neither intended nor should it be construed as being representative of the full extent and scope of the present invention. The present invention is set forth herein in various levels of detail as well as in the attached drawings and in the detailed description of the invention and no limitation as to the scope of the present invention is intended by either the inclusion or non inclusion of elements, components, etc. Additional aspects of the present invention become more readily apparent from the detailed description, particularly when taken together with the drawings.

In addition, exemplary embodiments have been described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined not solely by the claims. The features illustrated or described in connection with one exemplary embodiment may be combined with the features of other embodiments. Such modifications and variations are intended to be included within the scope of the present invention. A number of problems with conventional methods and systems are noted herein and the methods and systems disclosed herein may address one or more of these problems. By describing these problems, no admission as to their knowledge in the art is intended. A person having ordinary skill in the art will appreciate that, although certain methods and systems are described herein, the scope of the present invention is not so limited. Moreover, while this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A fuel cell comprising at least a bottom plate, a top plate, an active area formed by a membrane electrode assembly between said plates and a gasket on each side of said membrane electrode assembly, wherein said fuel cell further comprises manifolds for the passage of gas in said cell, wherein a flow path being placed between said manifold and said active area, wherein said flow path comprises a mechanical structure that extends over the total height of the flow path, wherein said mechanical structure comprises at least a first set of a plurality of wires and a flat piece, and wherein the at least first set of a plurality of wires is attached on the flat piece.

2. The fuel cell as defined in claim 1, wherein said wires are straight or curved, forming straight channels or tilted channels or curved channels.

3. The fuel cell as defined in claim 1, wherein said first and second set of wires are of the same material or a different material.

4. The fuel cell as defined in claim 1, wherein said wires are made of metal and/or synthetic materials.

5. The fuel cell as defined in claim 1, wherein the gaskets comprise the flow path.

6. The fuel cell as defined in claim 1, wherein the bottom plate and the top plate comprise the flow path.

7. The fuel cell as defined in claim 1, wherein said manifolds form the inlet and the outlet of the cell, and the flow paths are the same at the inlet and at the outlet.

8. The fuel cell as defined in claim 1, wherein said manifolds form the inlet and the outlet of the cell, and the flow paths are not the same at the inlet and at the outlet.

9. An assembly comprising at least one fuel cell as defined in claim 1 and a cooling plate.

10. The assembly as defined in claim 9, wherein said assembly comprises a plurality of stacked fuel cells and cooling plates, said cooling plates being interposed between said fuel cells.

11. The assembly as defined in claim 9, wherein said assembly comprises a frame which comprises the flow path and which acts as a spacer between cells and as a support for the flow paths.

12. A method for producing the frame as defined in claim 11, wherein said method comprises a step of compression or injection moulding of said frame.

13. A method for producing the flow path as defined in claim 1, wherein said method comprises a step of compression or injection moulding of said flow path.

* * * * *